(12) United States Patent
Lee et al.

(10) Patent No.: US 10,218,034 B2
(45) Date of Patent: Feb. 26, 2019

(54) ELECTROLYTE FOR SODIUM SECONDARY BATTERY AND SODIUM SECONDARY BATTERY USING THEREOF

(71) Applicants: SK INNOVATION CO., LTD., Seoul (KR); UNIST (ULSAN NATIONAL INSTITUTE OF SCIENCE AND TECHNOLOGY), Ulsan (KR)

(72) Inventors: Seung Ok Lee, Daejeon (KR); Won Sang Koh, Daejeon (KR); Jeong Soo Kim, Daejeon (KR); Dai In Park, Daejeon (KR); Je Hyun Chae, Daejeon (KR); Nam Soon Choi, Busan (KR); Jun Yeong Jang, Ulsan (KR)

(73) Assignees: SK INNOVATION CO., LTD., Seoul (KR); UNIST (ULSAN NATIONAL INSTITUTE SCIENCE AND TECHNOLOGY), Ulsan (KR)

( * ) Notice: Subject to any disclaimer, the term of this patent is extended or adjusted under 35 U.S.C. 154(b) by 455 days.

(21) Appl. No.: 14/923,020

(22) Filed: Oct. 26, 2015

(65) Prior Publication Data
US 2016/0118695 A1    Apr. 28, 2016

(30) Foreign Application Priority Data

Oct. 28, 2014 (KR) .......... 10-2014-0147059

(51) Int. Cl.
*H01M 10/39* (2006.01)
*H01M 10/054* (2010.01)
*H01M 10/0567* (2010.01)
*H01M 4/38* (2006.01)

(52) U.S. Cl.
CPC ....... *H01M 10/399* (2013.01); *H01M 10/054* (2013.01); *H01M 10/0567* (2013.01); *H01M 4/38* (2013.01); *H01M 4/381* (2013.01); *H01M 2300/0048* (2013.01); *H01M 2300/0062* (2013.01); *H01M 2300/0074* (2013.01); *H01M 2300/0088* (2013.01)

(58) Field of Classification Search
CPC .......... H01M 10/399; H01M 10/0567; H01M 10/054; H01M 4/381; H01M 4/38; H01M 2300/0048; H01M 2300/0062; H01M 2300/0074; H01M 2300/0088
See application file for complete search history.

(56) References Cited

U.S. PATENT DOCUMENTS 4,975,343 A * 12/1990 Coetzer ................. H01M 10/39
                                                      429/103
2003/0054255 A1    3/2003 Hidaka et al.

* cited by examiner

*Primary Examiner* — Laura Weiner
(74) *Attorney, Agent, or Firm* — IP & T Group LLP

(57) ABSTRACT

Provided are an electrolyte for a sodium secondary battery and a sodium secondary battery using the same. More particularly, the sodium secondary battery includes an anode containing sodium, a cathode containing a transition metal, and a sodium ion conductive solid electrolyte provided between the anode and the cathode, wherein the cathode is impregnated in an electrolyte containing a molten sodium salt and an electrolyte additive, the electrolyte additive including an inorganic sodium salt.

7 Claims, 2 Drawing Sheets

ELECTROLYTE FOR SODIUM SECONDARY BATTERY AND SODIUM SECONDARY BATTERY USING THEREOF

CROSS-REFERENCE TO RELATED APPLICATIONS

This application claims priority under 35 U.S.C. 5119 to Korean Patent Application No. 10-2014-0147059, filed on Oct. 28, 2014, in the Korean Intellectual Property Office, the disclosure of which is incorporated herein by reference in its entirety.

TECHNICAL FIELD

The following disclosure relates to an electrolyte for a sodium secondary battery, and a sodium secondary battery using the same.

BACKGROUND

In accordance with a rapid increase in the use of renewable energy, the necessity for an energy storage device using a battery has rapidly increased. Among these batteries, a lead battery, a nickel-hydrogen battery, a vanadium battery, and a lithium battery may be used. However, since the lead battery and the nickel-hydrogen battery have significantly low energy density, they require a large space in order to store the same capacity of energy therein. Further, in the case of the vanadium battery, the vanadium battery uses a solution containing a heavy metal, which causes environmental contamination, and a small amount of materials may move between an anode and a cathode through a membrane separating the anode and the cathode from each other, which deteriorates performance. Therefore, the vanadium battery cannot be commercialized on a large scale. The lithium battery having significantly excellent energy density and output characteristics is significantly advantageous in view of a technology. However, economical efficiency of the lithium battery is too low to be used as a secondary battery for large scale power storage due to scarcity of a lithium material.

In order to solve this problem, many attempts to use a sodium resource, which is sufficiently present on Earth, as a material of the secondary battery have been conducted.

Among them, as disclosed in U.S. Patent Application Publication No. 20030054255, a sodium-sulfur battery having a form in which a beta alumina having selective conductivity for a sodium ion is used, an anode is loaded with sodium, and a cathode is load with sulfur has been currently used as a large scale power storage device.

However, in the existing sodium based secondary battery such as the sodium-sulfur battery or a sodium-nickel chloride battery, conductivity thereof and melting points of battery compositions should be considered. For example, the sodium-nickel chloride battery has an operation temperature of at least 250° C. or more, and the sodium-sulfur battery has an operation temperature of at least 300° C. or more. Due to this problem, there are many disadvantages in view of economical efficiency in manufacturing or operating the sodium based secondary battery while maintaining a temperature and sealability of the battery and reinforcing safety thereof.

In order to solve the above-mentioned problems, a room-temperature sodium based battery has been developed, but the output thereof is significantly low, such that the room-temperature sodium based battery has significantly low competitiveness as compared with the nickel-hydrogen battery or the lithium battery.

RELATED ART DOCUMENT

Patent Document

U.S. Patent Application Publication No. 20030054255

SUMMARY

An embodiment of the present invention is directed to providing an electrolyte for a sodium secondary battery of which a melting point is decreased by adding an inorganic sodium salt to a molten sodium salt. Another embodiment of the present invention is directed to providing an electrolyte capable of driving a battery without a rapid decrease in ion conductivity, while decreasing a melting point.

Another embodiment of the present invention is directed to providing a sodium secondary battery capable of operating at a low temperature, preventing degradation to improve a life cycle of a battery, having high ion conductivity, and having a non-volatile and non-explosive properties by using an electrolyte of which a melting point is decreased by adding an inorganic sodium salt to a molten sodium salt as an electrolyte of the sodium secondary battery.

Another embodiment of the present invention is directed to providing a sodium secondary battery capable of operating at a low temperature to thereby decrease a manufacturing cost and secure stability.

In one general aspect, an electrolyte for a sodium secondary battery contains a molten sodium salt and an electrolyte additive made of an inorganic sodium salt.

The inorganic sodium salt may include a salt represented by the following Chemical Formula.

$$Na_xA \quad \text{Chemical Formula}$$

In the Chemical Formula, A is at least one anion selected from the group consisting of $S_aO_b^{2-}/(1 \le a < 4, 1 < b < 9)$, nitrate ion ($NO_3^-$), and a combination thereof, x is an integer of 1 to 4, which is selected depending on an ionic valence of A, which is a counter ion.

$Na_xA$ may be one or more selected from the group consisting of sodium sulfate ($Na_2SO_4$), anhydrous sodium sulfate ($Na_2SO_3$), sodium thiosulfate ($Na_2S_2O_3$), sodium metabisulfite ($Na_2S_2O_5$), sodium pyrosulfate ($Na_2S_2O_7$), sodium nitrate ($NaNO_3$), and a combination thereof.

The molten sodium salt may be at least one of sodium tetrachloroaluminate ($NaAlCl_4$), sodium tetrabromoaluminate ($NaAlBr_4$), and sodium tetraiodoaluminate ($NaAlI_4$).

The electrolyte may contain 0.1 to 20 wt % of the electrolyte additive.

The electrolyte for a sodium secondary battery may have a melting point of 180° C. or less by adopting the above-mentioned configuration.

The electrolyte for a sodium secondary battery may have ion conductivity of 200 ms/cm or more at the time of being melted by adopting the above-mentioned configuration.

Meanwhile, a sodium secondary battery using the electrolyte for a sodium secondary battery as described above may be manufactured.

In detail, in another general aspect, a sodium secondary battery includes: a cathode impregnated in an electrolyte for a sodium secondary battery containing a molten sodium salt and an electrolyte additive including at least one salt represented by the following Chemical Formula, and containing a transition metal; an anode containing sodium; and a sodium ion conductive solid electrolyte provided between the cathode and the anode.

$$Na_xA \quad \text{Chemical Formula}$$

In the Chemical Formula, A is at least one anion selected from the group consisting of $S_aO_b^{2-}$ ($1 \leq a < 4$, $1 < b < 9$), a nitrate ion ($NO_3^-$), and a combination thereof.

More specifically, A is one or more anions selected from the group consisting of a sulfate ion, which is any one selected from $SO_4^{2-}$, $SO_3^{2-}$, $S_2O_3^{2-}$, $S_2O_5^{2-}$, and $S_2O_7^{2-}$, the nitrate ion ($NO_3^-$), and the combination thereof, x is an integer of 1 to 4, which is selected depending on an ionic valence of A, which is a counter ion.

$Na_xA$ may be one or more selected from the group consisting of sodium sulfate ($Na_2SO_4$), anhydrous sodium sulfate ($Na_2SO_3$), sodium thiosulfate ($Na_2S_2O_3$), sodium metabisulfite ($Na_2S_2O_5$), sodium pyrosulfate ($Na_2S_2O_7$), sodium nitrate ($NaNO_3$), and a combination thereof.

The molten sodium salt may be at least one of sodium tetrachloroaluminate ($NaAlCl_4$), sodium tetrabromoaluminate ($NaAlBr_4$), and sodium tetraiodoaluminate ($NaAlI_4$).

The electrolyte may contain 0.1 to 20 wt % of the electrolyte additive.

The electrolyte may have a melting point of 180° C. or less.

The electrolyte may have ion conductivity of 200 ms/cm or more at the time of being melted.

The sodium secondary battery may be driven in an operation temperature range of 120 to 350° C. by adopting the above-mentioned configuration.

The anode may contain molten sodium.

The cathode may contain one or more metals selected from nickel (Ni), copper (Cu), iron (Fe), manganese (Mn), cobalt (Co), and an alloy thereof.

DETAILED DESCRIPTION OF MAIN ELEMENTS

Figure 1:
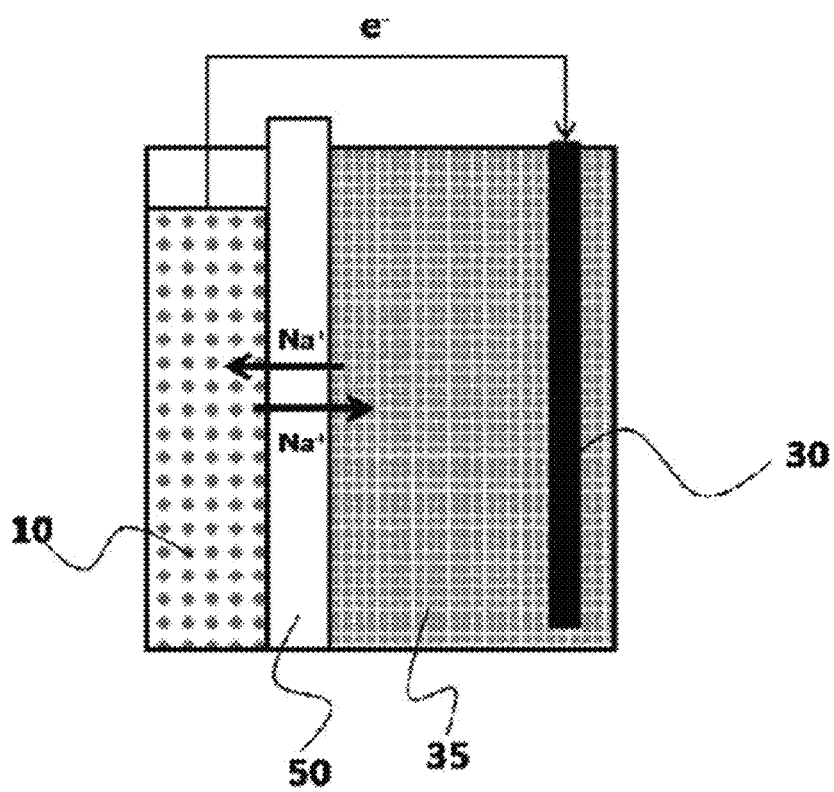
FIG. 1 is a conceptual view schematically showing a structure of a sodium secondary battery according to an exemplary embodiment of the present invention.

1: Sodium secondary battery
10: Anode
30: Cathode
35: Electrolyte
50: Solid electrolyte

DETAILED DESCRIPTION OF EMBODIMENTS

Hereinafter, a sodium secondary battery according to the present invention will be described in detail with reference to the accompanying drawings.

The following accompanying drawings are provided by way of example so that the idea of the present invention can be sufficiently transferred to those skilled in the art to which the present invention pertains. Therefore, the present invention is not limited to the drawings to be provided below, but may be modified in different forms. In addition, the drawings to be provided below may be exaggerated in order to clarify the scope of the present invention. In addition, like reference numerals denote like elements throughout the specification.

Here, technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

In general, as a molten salt electrolyte of a secondary battery such as a zebra battery, or the like, sodium tetrachloroaluminate ($NaAlCl_4$) has been used. It has been known that a molten salt of sodium tetrachloroaluminate ($NaAlCl_4$) as described above is advantageous in view of stability and ion conductivity of a sodium secondary battery.

However, since the molten salt of sodium tetrachloroaluminate ($NaAlCl_4$) has a melting point of 155 to 2001: depending on a purity thereof, there was a limitation in that an operation temperature of a secondary battery using a molten salt electrolyte of sodium tetrachloroaluminate ($NaAlCl_4$) is substantially 300° C., which is significantly high.

Therefore, the present invention is to overcome the limitation as described above and to provide an electrolyte for a sodium secondary battery having a low melting point as compared to the molten salt electrolyte of sodium tetrachloroaluminate ($NaAlCl_4$) according to the related art, and provide a sodium secondary battery capable of operating at a relatively low temperature by using the electrolyte for a sodium secondary battery.

The electrolyte for a sodium secondary battery according to the exemplary embodiment of the present invention may be configured to contain a molten sodium salt and an electrolyte additive made of an inorganic sodium salt.

Here, as the molten sodium salt, an electrolyte material capable of being applied to a sodium secondary battery according to the related art may be used without limitation, but as a specific and non-restrictive example thereof, sodium tetrachloroaluminate ($NaAlCl_4$), sodium tetrabromoaluminate ($NaAlBr_4$), and sodium tetraiodoaluminate ($NaAlI_4$), or the like, may be used. In view of a melting point and ion conductivity, it is preferable to use sodium tetrachloroaluminate ($NaAlCl_4$).

In addition, the electrolyte additive may include at least one inorganic sodium salt, wherein the inorganic sodium salt may include a salt represented by the following Chemical Formula.

$$Na_xA \quad \text{Chemical Formula}$$

In the Chemical Formula,

A is at least one anion selected from the group consisting of $S_aO_b^{2-}$ ($1 \leq a < 4$, $1 < b < 9$), a nitrate ion ($NO_3^-$), and a combination thereof, and x is an integer of 1 to 4, which is selected depending on an ionic valence of A, which is a counter ion. Therefore, the electrolyte of the sodium secondary battery according to the exemplary embodiment of the present invention may be composed of the molten sodium salt and at least one inorganic sodium salt represented by Chemical Formula.

In detail, A may be one or more anions selected from the group consisting of a sulfate ion, which is any one selected from $SO_4^{2-}$, $SO_3^{2-}$, $S_2O_3^{2-}$, $S_2O_5^{2-}$, and $S_2O_7^{2-}$, the nitrate ion ($NO_3^-$), and the combination thereof.

More specifically, as the salt represented by $Na_xA$ (Chemical Formula), any inorganic sodium salt may be used as long as it is a sodium compound including an inorganic salt as a counter ion. As a preferable example of the inorganic salt, which is the counter ion, A may be at least one selected from the group consisting of a sulfate ion ($SO_4^{2-}$), an anhydrous sulfate ion ($SO_3^{2-}$), a thiosulfate ion ($S_2O_3^{2-}$), a metabisulfite ion ($S_2O_5^{2-}$), a pyrosulfate ion ($S_2O_7^{2-}$), a nitrate ion ($NO_3^-$), and a combination thereof. More preferably, the sulfate ion ($SO_4^{2-}$) may be used. The inorganic sodium salt ($Na_xA$) as described above may be one or two or more salts selected from the group consisting of sodium sulfate ($Na_2SO_4$), anhydrous sodium sulfate ($Na_2SO_3$), sodium thiosulfate ($Na_2S_2O_3$), sodium metabisulfite ($Na_2S_2O_5$), sodium pyrosulfate ($Na_2S_2O_7$), sodium nitrate ($NaNO_3$), and a combination thereof, and may be preferably, sodium sulfate ($Na_2SO_4$), more preferably, 0.1 to 20 wt % of sodium sulfate ($Na_2SO_4$), most preferably, 5 to 7 wt % of sodium sulfate ($Na_2SO_4$).

As described above, in the sodium secondary battery according to the present invention, an electrolyte in a mixed salt state in which the molten sodium salt and the above-mentioned electrolyte additive are contained may be used as the electrolyte. In this case, as the electrolyte contains the electrolyte additive including the inorganic sodium salt, a melting point of the electrolyte may be decreased. In detail, the melting point of the electrolyte may be decreased to 1801 or less, and more preferably, the melting point of the electrolyte may be 100 to 180° C. The reason of the decrease in the melting point as described above may be that as the electrolyte additive including the inorganic sodium salt according to the present invention is added to the molten sodium salt, a stable lattice shape of the molten sodium salt becomes unstable.

In addition, even though the melting point of the electrolyte is decreased as described above, since ion conductivity of the electrolyte may be a predetermined level or more, a secondary battery using the electrolyte may be efficiently driven. In detail, the ion conductivity of the electrolyte may be 200 ms/cm or more, preferably, 320 ms/cm or more but 450 ms/cm or less at about 180° C.

It is preferable that the electrolyte contains 0.1 to 20 wt % of the electrolyte additive. In detail, when a content of the electrolyte additive in the electrolyte is less than 1.1 wt %, the melting point of the electrolyte may not be decreased, and when the content of the electrolyte additive in the electrolyte is more than 20 wt %, ion conductivity may be decreased, such that it may be impossible to drive the battery.

Meanwhile, a sodium secondary battery using the electrolyte for a sodium secondary battery as described above may be manufactured.

More specifically, a sodium secondary battery according to an exemplary embodiment of the present invention includes an anode containing sodium, a cathode containing a transition metal, and a sodium ion conductive solid electrolyte provided between the anode and the cathode as illustrated in FIG. 1, wherein the cathode is impregnated in an electrolyte containing a molten sodium salt and an electrolyte additive including an inorganic sodium salt.

Here, the electrolyte may be configured to include the molten sodium salt and the electrolyte additive made of the inorganic sodium salt.

In this case, as the molten sodium salt, an electrolyte material capable of being applied to a sodium secondary battery according to the related art may be used without limitation, but as a specific and non-restrictive example thereof, sodium tetrachloroaluminate ($NaAlCl_4$), sodium tetrabromoaluminate ($NaAlBr_4$), and sodium tetraiodoaluminate ($NaAlI_4$), or the like, may be used. In view of a melting point and ion conductivity, it is preferable to use sodium tetrachloroaluminate ($NaAlCl_4$).

In addition, the electrolyte additive may contain at least one inorganic sodium salt, wherein the inorganic sodium salt may include a salt represented by the following Chemical Formula.

$Na_xA$                                    Chemical Formula

In the Chemical. Formula, A is one or more anions selected from the group consisting of a sulfate ion, which is any one selected from $SO_4^{2-}$, $SO_3^{2-}$, $S_2O_3^{2-}$, $S_2O_5^{2-}$, and $S_2O_7^{2-}$, a nitrate ion ($NO_3^-$), and a combination thereof, x is an integer of 1 to 4, which is selected depending on an ionic valence of A, which is a counter ion. Therefore, the electrolyte of the sodium secondary battery according to the exemplary embodiment of the present invention may be composed of the molten sodium salt and at least one inorganic sodium salt represented by the Chemical Formula.

More specifically, as the salt represented by $Na_xA$ (Chemical Formula), any inorganic sodium salt may be used as long as it is a sodium compound including an inorganic salt as a counter ion. As a specific and preferable example of the inorganic salt, which is the counter ion, A may be at least one selected from the group consisting of a sulfate ion, which is any one selected from $SO_4^{2-}$, $SO_3^{2-}$, $S_2O_3^{2-}$, $S_2O_5^{2-}$, and $S_2O_7^{2-}$, a nitrate ion ($NO_3^-$), and a combination thereof. The inorganic sodium salt ($Na_xA$) as described above may be one or two or more salts selected from the group consisting of sodium sulfate ($Na_2SO_4$), anhydrous sodium sulfate ($Na_2SO_3$), sodium thiosulfate ($Na_2S_2O_3$), sodium metabisulfite ($Na_2S_2O_5$), sodium pyrosulfate ($Na_2S_2O_7$), sodium nitrate ($NaNO_3$), and a combination thereof.

Hereinafter, a configuration of the electrolyte for a sodium secondary battery used in the sodium secondary battery according to the exemplary embodiment of the present invention is the same as described above, and a description thereof is as described above.

Further, in the sodium secondary battery according to the exemplary embodiment of the present invention, the anode may contain a sodium metal or sodium alloy. As a non-restrictive example, the sodium alloy may be an alloy of sodium and cesium, an alloy of sodium and rubidium, or a mixture thereof. An anode active material may be a solid-state material or a liquid-state material including a molten state material at an operation temperature of the battery. In this case, in order to implement capacity of the battery so as to be 50 Wh/kg or more, the anode active material may be molten sodium (molten Na).

In the sodium secondary battery according to the exemplary embodiment of the present invention, the cathode of the sodium secondary battery may contain the transition metal. Here, the transition metal may include copper, silver, gold, nickel, palladium, platinum, cobalt, rhodium, iridium, iron, manganese, chromium, vanadium, molybdenum, or the like. Preferably, the transition metal may be one metal selected from nickel (Ni), copper (Cu), iron (Fe), manganese (Mn), cobalt (Co), and an alloy thereof.

Meanwhile, as the sodium secondary battery according to the exemplary embodiment of the present invention uses a mixed electrolyte in a liquid state in an operation temperature range of the battery, charge and discharge reactions may occur. In detail, the charge and discharge reactions as described above may be charge and discharge reactions according to the following Reaction Formulas 1 and 2.

In the following Reaction Formulas 1 and 2, the case in which nickel (Ni) is used as a cathode material and an electrolyte containing sodium sulfate (Na$_2$SO$_4$) as the electrolyte additive and sodium tetrachloroaluminate (NaAlCl$_4$) as the molten sodium salt is used is described by way of example, but the present invention is not limited thereto. In this case, the electrolyte may contain 3 wt % (4.0 mol %) of sodium sulfate (Na$_2$SO$_4$).

In the sodium secondary battery according to the present invention configured as described above, a charge reaction is carried out according to the following Reaction Formula 1, a discharge reaction is carried out according to the following Reaction Formula 2, and these charge and discharge reactions of the battery may be carried out on the cathode of the sodium secondary battery.

$$Ni+2NaCl \rightarrow NiCl_2+2Na^++2e^- \quad \text{Reaction Formula 1}$$

$$NiCl_2+2Na^++2e^- \rightarrow Ni+2NaCl \quad \text{Reaction Formula 2}$$

In this case, as the battery according to the present invention is a sodium secondary battery, an alkali metal ion (that is, a sodium ion) generated by the charge reaction of the battery may be an ion conducting (transporting) material passing through the solid electrolyte in the battery to thereby be directly transferred to the anode. Further, as the mixed electrolyte according to the present invention is configured to include sodium ions, sodium ions dissociated from the mixed electrolyte may also serve as the ion conducting (transporting) material, which may be preferable in view of improving ion conductivity of the sodium secondary battery.

Further, in the sodium secondary battery according to the exemplary embodiment of the present invention, the solid electrolyte may be provided between the cathode and the anode and formed of the sodium ion conductive solid electrolyte. In this case, as the sodium ion conductive solid electrolyte, any material may be used as long as it physically separates the cathode and the anode from each other, has selective conductivity for the sodium ion. In addition, any solid electrolyte may be used as long as it is generally used for selective conduction of the sodium ion in a battery field. As a non-restrictive example, the solid electrolyte according to exemplary embodiment of the present invention may be Na super ionic conductor (NASICON), β-alumina, or β"-alumina. In addition, as a non-restrictive example, the NASICON may include a Na—Zr—Si—O based complex oxide, a Na—Zr—Si—P—O based complex oxide, a Y-doped Na—Zr—Si—P—O based complex oxide, a Fe-doped Na—Zr—Si—P—O based complex oxide, or a mixture thereof. In detail, the NASICON may include Na$_3$Zr$_2$Si$_2$PO$_{12}$, Na$_{1+x}$Si$_x$Zr$_2$P$_{3-x}$O$_{12}$ (x is a real number satisfying the following Inequality: 1.6<x<2.4), Y- or Fe-doped Na$_3$Zr$_2$Si$_2$PO$_{12}$, Y- or Fe-doped Na$_{1+x}$Si$_x$Zr$_2$P$_{3-x}$O$_{12}$ (x is a real number satisfying the following Inequality: 1.6<x<2.4), or a mixture thereof.

The sodium secondary battery according to the exemplary embodiment of the present invention may have a plate type battery structure including a plate shaped solid electrolyte or a tube type battery structure including a tube shaped solid electrolyte of which one end is closed, based on a shape of the solid electrolyte separating the anode and the cathode to partition off an anode space from a cathode space.

Meanwhile, in the cases of sodium based secondary batteries according to the related art, there was a disadvantage in that a sodium-nickel chloride battery has an operation temperature of at least 250° C. or more, and a sodium-sulfur battery has an operation temperature is at least 300° C. or more in consideration of conductivity and melting points of battery compositions.

However, as the electrolyte of the sodium secondary battery according to the exemplary embodiment of the present invention contains the electrolyte additive including the inorganic sodium salt, the electrolyte additive inhibits formation of a stable lattice of the molten sodium salt in the electrolyte, thereby making it possible to decrease the melting point of the electrolyte without decreasing ion conductivity of the sodium secondary battery. Further, it is possible to operate the battery at a low temperature.

Specifically, the sodium secondary battery according to the exemplary embodiment of the present invention may have an operation temperature of 3001° C. or less, more specifically, 120° C. or more but 300° C. or less. More preferably, the operation temperature may be 120° C. or more but 200° C. or less.

In addition, ion conductivity of the electrolyte of the sodium secondary battery according to the exemplary embodiment of the present invention may be 200 ms/cm or more, preferably, 320 ms/cm or more at about 180° C.

Hereinafter, specific Examples according to the present invention will be described in detail.

[Electrolyte]

An electrolyte was prepared by adding an inorganic sodium salt according to the exemplary embodiment of the present invention to a molten sodium salt (NaAlCl$_4$) and mixing them, and a melting temperature (melting point) thereof was measured and illustrated in the following [Table 1].

TABLE 1

| Classification | Electrolyte Additive (A) | Molten Sodium Salt (B) | Molar concentration (mol %) of A | Content (wt %) of A | Melting Point (° C.) | Ion Conductivity (ms/cm) (at, 180° C.) |
|---|---|---|---|---|---|---|
| Comparative Example 1 | — | NaAlCl$_4$ | | | 155 | 356.94 |
| Example 1 | Na$_2$SO$_4$ | NaAlCl$_4$ | 1.3 | 1 | 150 | 376.17 |
| Example 2 | Na$_2$SO$_4$ | NaAlCl$_4$ | 4.0 | 3 | 135 | 376.79 |
| Example 3 | Na$_2$SO$_4$ | NaAlCl$_4$ | 6.6 | 5 | 130 | 398.28 |
| Example 4 | Na$_2$SO$_4$ | NaAlCl$_4$ | 9.2 | 7 | 125 | 387.86 |
| Example 5 | NaNO$_3$ | NaAlCl$_4$ | 6.5 | 3 | 135 | 329.40 |
| Example 6 | Na$_2$SO$_3$ | NaAlCl$_4$ | 7.4 | 5 | 128 | — |
| Example 7 | Na$_2$S$_2$O$_3$ | NaAlCl$_4$ | 5.0 | 5 | 138 | 325.72 |
| Example 8 | Na$_2$S$_2$O$_7$ | NaAlCl$_4$ | 2.6 | 3 | 145 | 332.82 |

In this case, the content of the electrolyte additive A means a total content of the electrolyte additive contained in the entire electrolyte and was calculated by the following Equation.

Content (wt %) of electrolyte additive=weight of (A)/weight of (A+B)×100

Here, A is the inorganic sodium salt, B is the molten sodium salt, the weight of (A) is a total weight of the electrolyte additive, and the weight of (A+B) is a total weight of the electrolyte.

Referring to [Table 1], it may be confirmed that melting points of electrolytes for a sodium secondary battery in Examples 1 to 5 according to the present invention were decreased as compared to a molten salt electrolyte made of only sodium tetrachloroaluminate (NaAlCl$_4$) in Comparative Example 1. Further, it may be confirmed that ion conductivity in Examples 1 to 5 was also high at a predetermined level or more. Although ion conductivity was not improved in all of the electrolytes of Examples 1 to 5, a degree of ion conductivity may be selectively adopted depending on the purpose of the battery. In detail, it may be appreciated that ion conductivity of the electrolyte according to the exemplary embodiment of the present invention may be 200 ms/cm or more, preferably, 320 ms/cm or more at about 180° C.

However, in view of securing efficient ion conductivity for driving the battery while decreasing the melting point of the electrolyte, and preventing problems such as thermal deformation, a high melting point, electrical deformation, or the like, the electrolytes of Examples 1 to 5 may be preferable. Further, in view of the melting point and efficiency of ion conductivity, the electrolytes of Examples 2 and 3 may be preferable. Further, in view of the melting point, high efficiency of ion conductivity, and excellent thermal stability, the electrolyte of Example 3 may be most preferable.

[Operation of Sodium Secondary Battery Depending on Use of Electrolyte

It was confirmed that a sodium secondary battery was smoothly driven by confirming a charge and discharge graph of a sodium secondary battery manufactured according to the present invention.

More specifically, a nickel (Ni) cathode, a molten sodium anode, and a NASICON solid electrolyte were used, and the cathode was impregnated in the electrolyte of Example 3 as described above, thereby manufacturing the sodium secondary battery.

Figure 2:
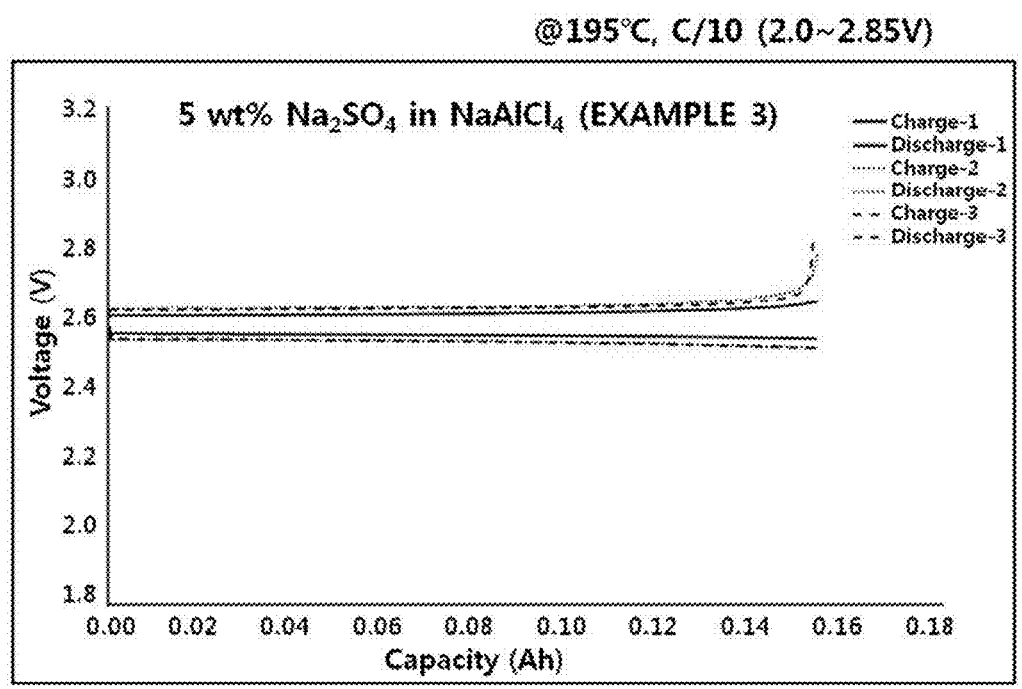
FIG. 2 is a charge and discharge graph of a sodium secondary battery manufactured using an electrolyte of Example 3 according to the present invention.

Referring to FIG. 2, it may be confirmed that the sodium secondary battery manufactured according to the present invention smoothly operated at a battery voltage of 2.0 to 2.85V at the time of charging and discharging the battery at 0.1 C rate at an operation temperature of about 195° C.

In detail, referring to [Table 1], since the melting point of the molten salt of sodium tetrachloroaluminate (NaAlCl$_4$) was 155° C. in Comparative Example, which is an electrolyte according to the related art, an operation temperature of a secondary battery using the molten salt of sodium tetrachloroaluminate (NaAlCl$_4$) as an electrolyte substantially reached 300° C.

On the contrary, FIG. 2 illustrates the sodium secondary battery using the electrolyte of Example 3, having a melting point of 130° C. In this case, it may be confirmed that as the electrolyte of Example 3 was in a liquid state electrolyte in the operation temperature range of the battery, all of the sodium secondary batteries using the electrolyte may smoothly operate at 195° C.

The sodium secondary battery according to the present invention uses the electrolyte having a low melting point as compared to the molten sodium salt electrolyte according to the related art, such that the sodium secondary battery may operate at a low temperature, improve the life cycle of the battery by preventing degradation, and have non-volatile and non-explosive properties while having high ion conductivity.

Further, the sodium secondary battery according to the present invention may operate at a low temperature, such that a manufacturing cost may be decreased, and stability may be secured.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

What is claimed is:

1. A sodium secondary battery having an operation temperature of 120° C. to 200° C. and comprising:
   a cathode containing a transition metal, and impregnated in an electrolyte having a melting point of 150° C. or less and comprising a molten sodium salt and an electrolyte additive made of an inorganic sodium salt represented by the following Chemical Formula:

Na$_x$A wherein A is at least one anion selected from the group consisting of S$_a$O$_b^{2-}$ (1≤a<4, 1<b<9), a nitrate ion (NO$_3^-$), and a combination thereof, and
   x is an integer of 1 to selected depending on an ionic valence of A which is a counter ion;
   an anode containing sodium; and
   a sodium ion conductive solid electrolyte provided between the cathode and the anode.

2. The sodium secondary battery of claim 1, wherein A is one or more anions selected from the group consisting of a sulfate ion, which is any one selected from SO$_4^{2-}$, SO$_3^{2-}$, S$_2$O$_3^{2-}$, S$_2$O$_5^{2-}$, and S$_2$O$_7^{2-}$, the nitrate ion (NO$_3^-$), and the combination thereof.

3. The sodium secondary battery of claim 2, wherein Na$_x$A is one or more selected from the group consisting of sodium sulfate (Na$_2$SO$_4$), anhydrous sodium sulfate (Na$_2$SO$_3$), sodium thiosulfate (Na$_2$S$_2$O$_3$), sodium metabisulfite (Na$_2$S$_2$O$_5$), sodium pyrosulfate (Na$_2$S$_2$O$_7$), sodium nitrate (NaNO$_3$), and a combination thereof.

4. The sodium secondary battery of claim 1, wherein the electrolyte contains 0.1 to 20 wt % of the electrolyte additive.

5. The sodium secondary battery of claim 1, wherein the electrolyte has ion conductivity of 200 ms/cm or more at the time of being melted.

6. The sodium secondary battery of claim 1, wherein the anode contains molten sodium.

7. The sodium secondary battery of claim 1, wherein the cathode contains one or more metals selected from nickel (Ni), copper (Cu), iron (Fe), manganese (Mn), cobalt (Co), and an alloy thereof.

* * * * *